June 8, 1954   H. G. HARTMAN ET AL   2,680,622
CHUCK
Filed Feb. 5, 1951   2 Sheets-Sheet 1
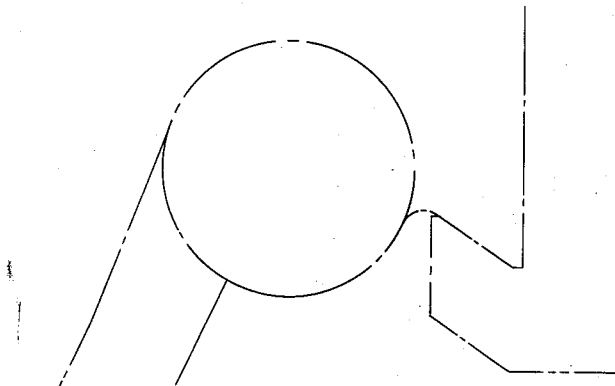
FIG. 1
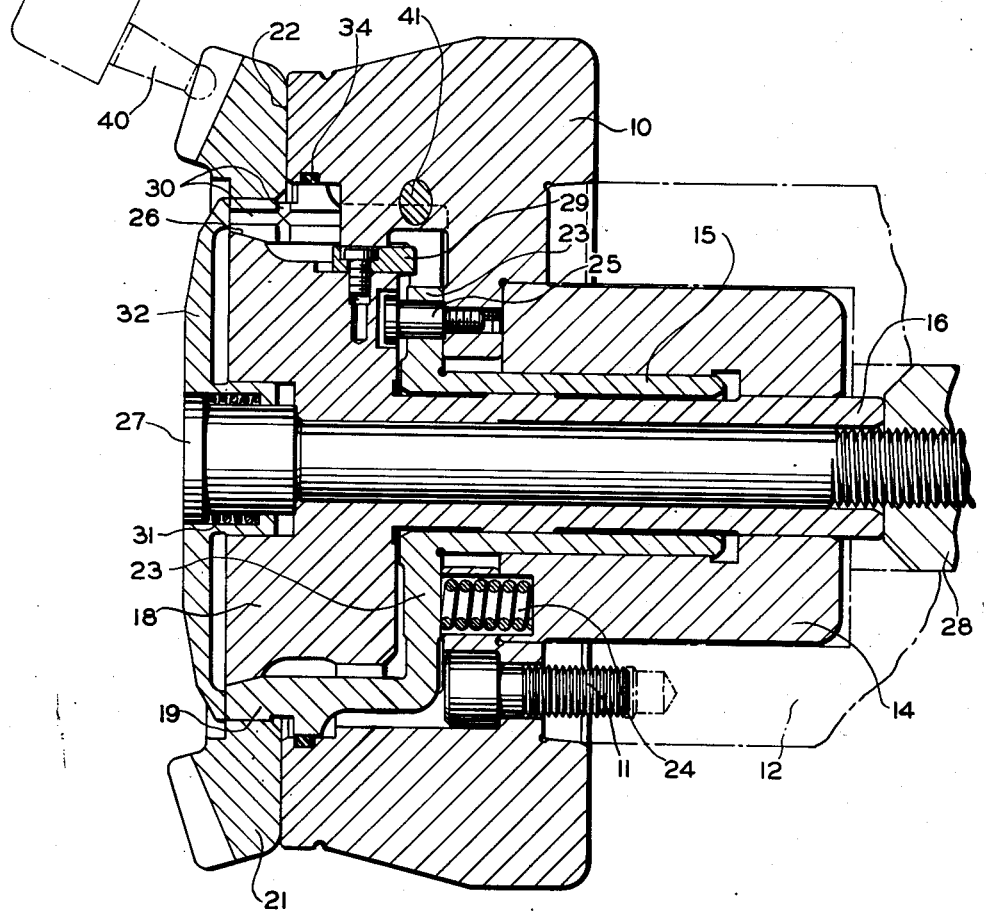
INVENTORS
HERBERT G. HARTMAN
ROBERT E. STARK
BY
*Richard W. Treverton*
ATTORNEY INVENTORS
HERBERT G. HARTMAN
ROBERT E. STARK
BY Richard W. Treverton
ATTORNEY Patented June 8, 1954

UNITED STATES PATENT OFFICE 2,680,622

CHUCK

Herbert G. Hartman, Irondequoit, and Robert E. Stark, Pittsford, N. Y., assignors to The Gleason Works, Rochester, N. Y., a corporation of New York Application February 5, 1951, Serial No. 209,474

6 Claims. (Cl. 279—2)

The present invention relates to chucks and particularly but not exclusively to chucks of the expanding arbor type such as are employed for securing gear blanks or gears on gear cutting and like machines.

Certain chucks of this kind made heretofore, of the general kind shown in Patent No. 2,453,262, granted November 9, 1948, employ a collet arranged to be expanded or contracted radially, and also to be shifted axially of the chuck body, by an axially movable operating member, to thereby cause the collet to grip the work gear and draw it against the face of the body. When the work gear has been chucked in this manner, the chuck body and the collet and the work gear are held only by friction against small relative angular displacements. The requirement that the collet have axial motion precludes it from being secured solidly to the chuck body; and it has been discovered that under certain conditions, for example under the impact of a cutting tool, the collet and the gear gripped by it may twist slightly on the body and thereby introduce a tooth spacing error which spoils the gear. This condition is especially likely to arise when cutting a spiral bevel or hypoid gear where the motion of the cutting tool across the face of the gear has a substantial component in a direction tangential of the gear, so that a high torque load is applied to the gear. The collet, in expanding radially, grips the work gear with a force much greater than that which presses the gear against the face of the chuck body, and it has been found that if the collet is held against turning movement relative to the body, the difficulty referred to is obviated.

A primary objective of the present invention therefore is the provision of means which will prevent any relative motion of the collet and the chuck body after the chucking operation has been completed. This objective is accomplished by providing facing abutments, respectively on the collet and on the body, through which the collet may transmit torque to the chuck body by metal-to-metal contact, and by further providing a means for applying a torque between the collet and the body for holding the abutments in such metal-to-metal contact during the chucking operation.

The foregoing and other objects and advantages will appear from the following description of the embodiment of the invention shown in the drawings, wherein:

Fig. 1 is an axial sectional view through the arbor taken approximately as indicated by line 1—1 of Fig. 2, with certain related machine parts shown in phantom;

Figure 2:
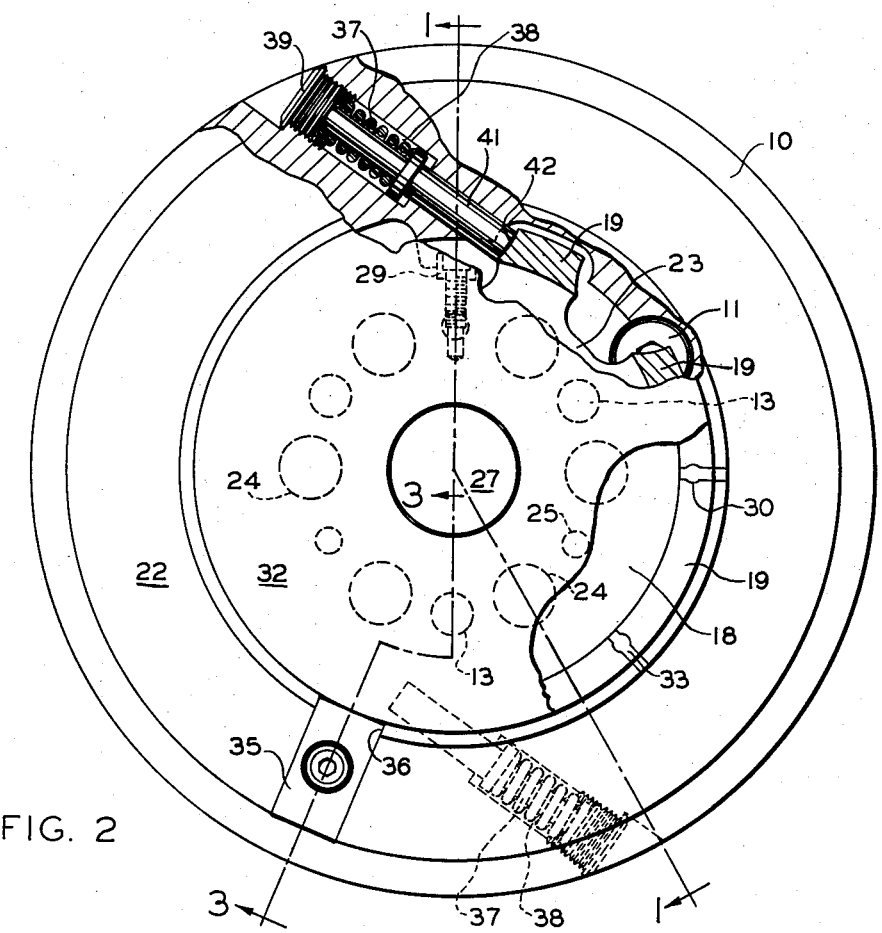
Fig. 2 is a front elevational view of the arbor with parts broken away and appearing in transverse section; and, Fig. 3 is a fragmentary axial sectional view taken as indicated by line 3—3 of Fig. 2.
Figure 3:
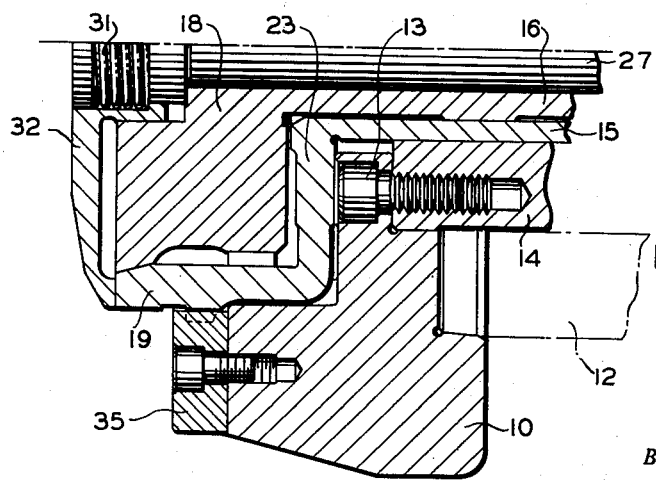

As shown in the drawings one form of chucking device to which the present invention is applicable comprises a body 10 adapted to be secured by screws 11 to the tapered nose of the tubular spindle 12 of a gear cutting machine. Secured to the body 10 by screws 13, and in effect a part of the body, is a tubular shank 14. Centered within this shank and adapted for axial motion relative to each other and to the shank are tubular stems 15 and 16, respectively, of an expansible collet and a collet expander 18. The end of the collet opposite the stem 15 thereof is split to provide multiple prongs 19 which may be sprung radially to grip the bore of the work 21. In the illustration the work comprises a ring gear that is to be drawn tight against the face 22 of the arbor body during the chucking operation. The collet has a central web 23, and between this web and the arbor body coil springs 24 are compressed, the springs being provided to urge axial motion of the collet in a dechucking direction. Such motion is limited by engagement of the web with the heads of studs 25 whose reduced shanks extend through openings in the web and are anchored to the arbor body.

The expander 18 serves as the means for expanding the collet and for drawing it axially (in the chucking direction). It has a conical surface 26 which fits a complementary surface in the split end of the collet. Extending through expander 18 is a bolt 27 for connecting it to a draw rod 28 that extends through the spindle 12. In order to prevent turning of the expander within the body 10, there is secured to it a key 29 that engages in a keyway in the body.

A spring 31 that is compressed between a flange on the head of bolt 27 and a cover 32 serves to draw the latter against the forward face of the collet to aid in keeping foreign matter out of the arbor. For the same purpose sealing material 33 is disposed between the prongs 19 of the collet, being keyed thereto by engaging grooves 30 therein; and a sealing ring 34 around the split end of the collet is disposed in an annular groove in the arbor body.

In use of the arbor on a gear cutting machine, the work gear is placed on the collet when the draw rod is moved, by any suitable means, not shown, to the dechucking position thereof (to the left of the position thereof shown in the drawing). In this dechucking position the conical surface of the expander is clear of, or at least exerts no pressure on, the complementary conical surface of the collet; and the latter is urged by springs 24 to the limit position determined by the heads of studs 25. In case the work gear has already been rough cut and is now being chucked for finish cutting, so that it is necessary to accurately divide stock between opposite sides of the teeth, a dividing gauge 40 that is suitably mounted on the machine is swung down to the position shown wherein it is entered between adjacent teeth of the gear to turn the gear into the proper relationship to the machine. While the gauge is so positioned the gear is chucked by the operation of means (not shown) that draws the rod 28 to the right. As the expander is thereby moved to the right its conical surface 26 first acts to expand the split end of the collet, for motion of the collet to the right is resisted by the springs 24. Accordingly the prongs 19 of the collet grip the bore of the gear and, then, the collet and gear move as a unit with the expander to draw the gear tightly against the face 22 if it is not already so positioned. The continued motion of the expander then draws the collet web tightly against the body 10 (the collet slipping axially in the bore of the gear enough to accommodate this collet motion) and, in the final part of the expander's chucking movement, the prongs 19 of the collet are wedged tightly within the bore of the gear.

It sometimes happens that the gear initially is not placed in full contact with the face 22, or that it is slightly tilted from such full contact by action of the dividing gauge 40. For these reasons the stroke of the collet, between its dechucking position against the heads of studs 25 and its chucking position shown in Fig. 1, is made long enough to provide a working margin of safety that will insure the gear being drawn tightly against the face 22 after the collet has initially expanded enough to grip it. The expander 18 must have a correspondingly long stroke, and hence reasonable working clearance must be provided between key 29 and its way.

In prior devices of the kind described there is only this key 29 and friction between the gear and face 22 of the arbor body to hold the gear from turning on the arbor, leading to the difficulty referred to hereinbefore.

The present invention provides on the arbor body an abutment in the form of a key 35 and on the collet a facing abutment surface 36, the two abutments being adapted when in metal-to-metal contact to transmit torque from the collet to the arbor body. With this arrangement the gear 21 when firmly gripped by the collet cannot turn relative to arbor body. Inasmuch as there must be clearance between the abutment surface of key 35 and the abutment surface 36 to permit the relative axial motion between the collet and the body, the invention further provides torque exerting means to hold the abutment surfaces in metal-to-metal contact during the chucking operation. In the device illustrated this means comprises a pair of springs 37 each arranged in a bore 38 in the arbor body and compressed between a plug 39 that is screw threaded into the bore and a shoulder on a pin 41 that is guided for movement in the bore. The inner ends of the pins contact surfaces 42 of the collet, and serve to transmit the compression load of the springs to the collet. The bores extend non-radially of the arbor body and collet so that the spring load is applied as a torque which urges rotation of the collet in the arbor to hold surface 36 in contact with the facing abutment surface of the key 35.

The direction of inclination of the non-radial bores 38 in any particular arbor will, of course, depend upon the direction of the torque load that will be imposed upon the gear by whatever tool is to operate upon it while it is chucked. In the arbor shown in the drawings, which is intended for chucking a conventional automotive spiral bevel ring gear during cutting thereof by a face mill cutter rotating in such a direction as to impose a torque load tending to turn the gear and collet in a clockwise direction (as viewed in Fig. 2), the bores 38 are therefore inclined so that the springs 37 act to turn the collet clockwise relative to the arbor body.

The foregoing disclosure is made by way of example to illustrate and explain the inventive principles involved, and not by way of limitation, there being no intention to limit the scope of the invention except as may be required by the appended claims.

We claim as our invention:

1. In a chucking device comprising a body and a collet which have coaxial centering surfaces, the body having a transverse work engaging face, the collet having parts movable radially to grip the work and being movable axially of the body to draw the work against said face, and means for effecting such radial and axial motions of the collet, the provision of facing abutments respectively on the body and on the collet through which the latter may transmit torque to the body, and means effective between the body and the collet for applying to them a torque to hold said abutments in contact.

2. A chucking device as characterized by claim 1 in which said means for applying a torque comprises a spring.

3. A chucking device as characterized by claim 1 in which said means for applying a torque comprises a plunger engaging the collet and supported for movement in a non-radial direction in the body, and a spring effective between the body and the plunger.

4. A chucking device as characterized by claim 1 in which said means for applying a torque comprises a plunger engaging the collet and arranged for movement along a non-radial bore in the body, a plug in the bore, and a spring compressed in the bore between the plug and the plunger.

5. In an arbor for chucking ring gears, comprising a body and a radially expansible work-gripping collet which have coaxial centering surfaces, the body having a transverse work engaging face and the collet being movable axially of the body to draw a ring gear against said face, and means for effecting radial expansion of the collet and such axial movement thereof, the provision of facing abutments respectively on the body and the collet through which the latter may transmit torque to the body, and resilient means effective between the body and the collet for applying to them a torque to hold said abutments in contact.

6. In an arbor as characterized by claim 5 in which said means for applying a torque comprises a plurality of plungers engaging the collet at spaced intervals therearound, each plunger being arranged for movement along a non-radial bore in the body, a plug in each bore, and a spring compressed in each bore between the plug and the plunger therein.

References Cited in the file of this patent

UNITED STATES PATENTS

| Number | Name | Date |
|---|---|---|
| 1,290,885 | Bolender | Jan. 14, 1919 |
| 1,725,342 | Copland | Aug. 20, 1929 |
| 2,018,088 | Poock et al. | Oct. 22, 1935 |
| 2,250,369 | Gorton | July 22, 1941 |
| 2,453,262 | Peters | Nov. 9, 1948 |

FOREIGN PATENTS

| Number | Country | Date |
|---|---|---|
| 464,875 | Great Britain | Apr. 27, 1937 |